(12) United States Patent
Tanner

(10) Patent No.: US 12,364,260 B2
(45) Date of Patent: Jul. 22, 2025

(54) ROBOTIC WEED TREATMENT PROCESSING EQUIPMENT AND AGRICULTURE ROBOTIC SYSTEM THEREWITH

(71) Applicant: EcoRobotix SA, Yverdon-les-Bains (CH)

(72) Inventor: Steve Tanner, Essert-Pittet (CH)

(73) Assignee: ECOROBOTIX SA, Yverdon-les-Bains (CH)

( * ) Notice: Subject to any disclaimer, the term of this patent is extended or adjusted under 35 U.S.C. 154(b) by 270 days.

(21) Appl. No.: 17/766,951

(22) PCT Filed: Aug. 21, 2020

(86) PCT No.: PCT/IB2020/057856
§ 371 (c)(1),
(2) Date: Apr. 6, 2022

(87) PCT Pub. No.: WO2021/069980
PCT Pub. Date: Apr. 15, 2021

(65) Prior Publication Data
US 2024/0074427 A1  Mar. 7, 2024

(30) Foreign Application Priority Data
Oct. 9, 2019  (CH) .......................... 128/19

(51) Int. Cl.
*A01M 21/00*  (2006.01)
(52) U.S. Cl.
CPC .................. *A01M 21/00* (2013.01)
(58) Field of Classification Search
CPC ...... A01M 21/00; A01M 7/005; A01M 15/00; A01M 21/02; A01M 21/04; A01M 7/0042
(Continued)

(56) References Cited

U.S. PATENT DOCUMENTS

| 5,606,821 A | 3/1997 | Sadjadi et al. |
| 6,795,568 B1 | 9/2004 | Christensen et al. |
| (Continued) | | |

FOREIGN PATENT DOCUMENTS

| DE | 102013222776 A1 | 5/2015 |
| EP | 3366133 A1 | 8/2018 |
| WO | WO-2017/002093 A1 | 1/2017 |

OTHER PUBLICATIONS

International Search Report and Written Opinion for PCT/IB2020/057856, dated Oct. 15, 2020, 10 pages.

*Primary Examiner* — Mohamed Abdo Algehaim
(74) *Attorney, Agent, or Firm* — BLANK ROME LLP

(57) ABSTRACT

The invention relates to a robotic weeding equipment for agriculture robotic weeding system, comprising: a plant squeezer for squeezing cultivated plants, comprising a narrowing end portion and two longitudinal sides, extending backwards from the narrowing end portion when mounted on the agriculture robotic weeding system; a plant squeezer actuator operably connected to the plant squeezer for vertical displacement of the plant squeezer when mounted on the agriculture robotic weeding system; an image recognition device for identification of weeds; and a weed treatment processing device. The plant squeezer is configured to squeeze two parallel rows of cultivated plants to increase the weeding surface between said two parallel rows of cultivated plants. The invention also relates to an agriculture robotic weeding system comprising at least one weeding equipment, preferably three weeding equipment arranged next to each other along a direction perpendicular to the direction of the agriculture robotic weeding system when operating.

19 Claims, 6 Drawing Sheets

(58) Field of Classification Search
USPC .......................................................... 701/28
See application file for complete search history.

(56) References Cited

U.S. PATENT DOCUMENTS

| | | | |
|---|---|---|---|
| 2015/0237790 A1* | 8/2015 | Redden | G01C 7/04 |
| | | | 701/50 |
| 2015/0245565 A1* | 9/2015 | Pilgrim | A01C 21/00 |
| | | | 239/71 |
| 2017/0238460 A1* | 8/2017 | MacKean | A01D 34/008 |
| 2018/0168141 A1* | 6/2018 | Tanner | A01M 7/00 |
| 2022/0044030 A1* | 2/2022 | Neumann | A01M 7/0089 |
| 2024/0074427 A1* | 3/2024 | Tanner | A01M 7/005 |

* cited by examiner

ROBOTIC WEED TREATMENT PROCESSING EQUIPMENT AND AGRICULTURE ROBOTIC SYSTEM THEREWITH

RELATED APPLICATIONS

This application is a national phase of PCT/IB2020/057856, filed on Aug. 21, 2020, which claims priority to Swiss Patent Application No. CH01280/19, filed on Oct. 9, 2019. The contents of these applications are hereby incorporated by reference in their entirety.

FIELD OF THE INVENTION

The present invention relates to a robotic weed treatment processing equipment particularly adapted for crops such as sugar beet which have grown to a size, whereby the base of the plants is hidden by their leaves. The present invention also relates to an agriculture robotic system comprising one or more robotic weed treatment processing equipment. The invention further relates to a method for weed treatment of agriculture crops comprising cultivated plants where their bases are hidden by their leaves.

DESCRIPTION OF RELATED ART

Weeding is a key agricultural operation which is continuously being improved to be more efficient and more selective, while addressing issues such as reduction of chemicals and conservation of soil fertility. Several weeding techniques have recently been introduced, relying on robotics and artificial vision, to perform site-specific plant removing operation, resulting in improved weeding coverage and/or reduction of chemicals.

U.S. Pat. No. 5,606,821 discloses for example a smart weed recognition and identification system for selectively dispensing herbicides.

U.S. Pat. No. 6,795,568 discloses an apparatus for severing or damaging an unwanted plant. The apparatus comprises an optical image recognition system for discriminating different types of plants from each other and a light generating device for exposing the plants to electromagnetic radiations.

WO2017002093 discloses a robotic weeding system for an automatic treatment of a weed. The robotic weeding system comprises a camera for capturing images of the weed and a computer vision system for determining a distance between a weed and a cultivated plant based of the captured images. The robotic weeding system also comprises a selecting device for selecting a treatment tool for a treatment of the weed from a group of treatment tools as a function of the distance determined by the computer vision system.

US2015245565 discloses a robotic device for applying chemicals to specific plants and parts of plants in natural settings as well as crop fields.

EP3366133 discloses an adjustable row unit and a robotic agricultural vehicle with an adjustable row.

These robotic systems are however not adapted for optimum weed treatments of crops of cultivated plants which have grown to a certain size as weeds located near the base of the cultivated plants are hidden by the plants themselves, often by their leaves and are therefore not visible or accessible for weed treatment.

An aim of the present invention is therefore to provide an agriculture robotic system comprising one or more robotic weed treatment processing equipment for more efficient weeding of crops of cultivated plants which have grown to a certain size.

Another aim of the present invention is to provide an agriculture robotic system adaptable for treatment of crops of cultivated plants of different sizes, ranging from young shoots to grown-up plants about to be harvested.

Another aim of the present invention is to provide an agriculture robotic system adapted for selective treatment of cultivated plants and weeds at the same time.

A further aim of the present invention is to provide a method of weed treatment of an agriculture crop.

BRIEF SUMMARY OF THE INVENTION

These aims are achieved by a robotic weed treatment equipment system according to an aspect of the invention and by an agriculture robotic system comprising one or more robotic weed treatment equipment system according to another aspect of the invention.

To that effect, the robotic weed treatment processing equipment for agriculture robotic system, comprises:
- a plant squeezer for squeezing cultivated plants, comprising a narrowing end portion and two longitudinal sides, said two longitudinal sides extending backwards from the narrowing end portion when the robotic weed treatment processing equipment is mounted on the agriculture robotic system;
- a plant squeezer actuator operably connected to the plant squeezer for vertical displacement of the plant squeezer when the robotic weed treatment processing equipment is mounted on the agriculture robotic system;
- an image recognition device for identification of weeds, and
- a weed treatment processing device.

The plant squeezer is configured to squeeze two parallel rows of cultivated plants to clear the ground from the leaves of the cultivated plants between said two parallel rows of cultivated plants.

The clearance of the ground has two advantages. The first is to allow the image recognition device to better see the ground where young weeds grow. Without this clearance, the ground and young weeds growing therefrom would be hidden by the leaves of the cultivated and would therefore not be seen by the image recognition. The second is to create free space from the leaves of the cultivated plant, where a weeding processing tool, for instance a spraying device, can better act on the weeds without being blocked by these leaves.

In an embodiment, the weed treatment processing device comprises a weed non-spraying device, a weed spraying device or both of said non-spraying and weed spraying devices.

In an embodiment, the weed spraying device comprises a plurality of group of sprayers and a corresponding plurality of distribution circuits comprising each an herbicide reservoir in fluid communication with a group of sprayers. Each of said plurality distribution circuits is configured to be individually controlled such that each group of sprayers may dispense a different class of herbicide.

In an embodiment, each sprayer is connected to a linear actuator for selective vertical displacement of each sprayer when the robotic weed treatment processing equipment is mounted on the agriculture robotic system.

In an embodiment, the weed non-spraying device comprises weeding elements. Each weeding element is connected to a three-dimensional (3D) positioning actuator for selective 3D positioning of the weeding elements when the robotic weed treatment processing equipment is mounted on the agriculture robotic system.

In an embodiment, each of the weeding elements is selected from the group comprising a mechanical tool, a thermal tool, an electrical tool, a laser emitting device, a radiation emitting device and an electromagnetic wave emitting device.

In an embodiment, the weeding elements of said weed non-spraying device are arranged next to each other along a direction perpendicular to the direction of the agriculture robotic system when the robotic weed treatment processing equipment is mounted on the agriculture robotic system and the robotic system is operating.

In an embodiment, the weeding elements are configured to be selectively actuated for 3D positioning depending on a specific weed location detected by the image recognition device.

In an embodiment, the plant squeezer comprises a front wheel mounted on the narrowing end portion of said squeezer.

In an embodiment, the plant squeezer comprises a linear actuator configured to move the two longitudinal sides of the squeezer away from each other or closer to each other in order to vary the distance between said two longitudinal sides to adapt the configuration of the plant squeezer according to the distance between two parallel rows of cultivated plants.

In an embodiment, the two longitudinal sides of the plant squeezer are inclined. The inclination may vary progressively outwardly along a longitudinal direction of the plant squeezer and away from its narrowing end portion.

In an embodiment, the image recognition device for identification of weeds is mounted above the plant squeezer.

In an embodiment, each of the two longitudinal sides of the plant squeezer comprises a rotatable belt and pulleys to drive the rotatable belt. Each rotatable belt is configured to become in contact against the corresponding row of the cultivated plants. The pulleys are configured to be driven at a speed dependent to the speed of the agriculture robotic system to ensure no relative movement between the cultivated plants and the belts when the agriculture robotic system is operating.

Another aspect of the invention relates to an agriculture robotic system comprising at least one robotic weed treatment processing equipment as described above.

In an embodiment, the agriculture robotic system comprises three robotic weed treatment processing equipment. The three robotic weed processing equipment are arranged next to each other along a direction perpendicular to the direction of the agriculture robotic system when operating.

In an embodiment, the weed treatment processing equipment or each weed treatment processing equipment is positioned for treating a surface extending perpendicular to two parallel rows of cultivated plants up to or near to the base of said cultivated plants.

In an embodiment, the agriculture robotic system further comprises a cultivated plant spraying device comprising several cultivated plant spraying tools for application of any chemical found in agriculture such as insecticide, fungicide, nematocide or fertilizer.

In an embodiment, each cultivated plant spraying tool is connected to a linear actuator for selective vertical displacement of said tools depending on a specific location of action detected by the image recognition device In an embodiment, the cultivated plant treatment device is arranged rearward the weed treatment processing device relative to the driving direction of the agriculture robotic system when operating.

In an embodiment, the agriculture robotic system comprises a first and a second set of wheels located on respective lateral side of the agriculture robotic system. Each wheel of the robotic system is mounted on an axially vertical rotatable shaft to move each wheel from an outward position to an inward position through a rotation of 180 degrees of each rotatable shaft in order to adapt the distance between the two paths followed by respective first and second set of wheels of the robotic system when operating.

Another aspect of the invention relates to a method of weed treatment of an agriculture crop, wherein the agriculture crop comprises several parallel rows of cultivated plants which have grown from the ground to a certain size. The method comprises:

freeing simultaneously the hidden base of both cultivated plants arranged in parallel rows using a plant squeezer to increase the weed treatment surface between said two parallel rows of cultivated plants, wherein the plant squeezer comprises two longitudinal sides configured to move a portion of the cultivated plants of respective row in order to free their respective base so as to clear the ground to detect weeds on an increased ground surface using an image recognition device (30), and treating the increased weed treatment surface.

In an embodiment, the increased weed treatment surface is selectively treated on one or more specific weed locations detected by the image recognition device.

In an embodiment, the increased weed treatment surface extents up to or near to the base of the cultivated plants of each row.

In an embodiment, the cultivated plants of two parallel rows which are facing each other are treated simultaneously or quasi-simultaneously with the weeds.

In an embodiment, the increased weed treatment surface is treated with one of the group of treatments comprising weeding, herbicide treatment or insecticide treatment.

BRIEF DESCRIPTION OF THE DRAWINGS

The invention will be better understood with the aid of the description of several embodiments given by way of examples and illustrated by the figures, in which:

FIG. 3c shows a schematic partial side view of the agriculture robotic system of FIG. 3a;

DETAILED DESCRIPTION OF SEVERAL EMBODIMENTS OF THE INVENTION

Figure 1:
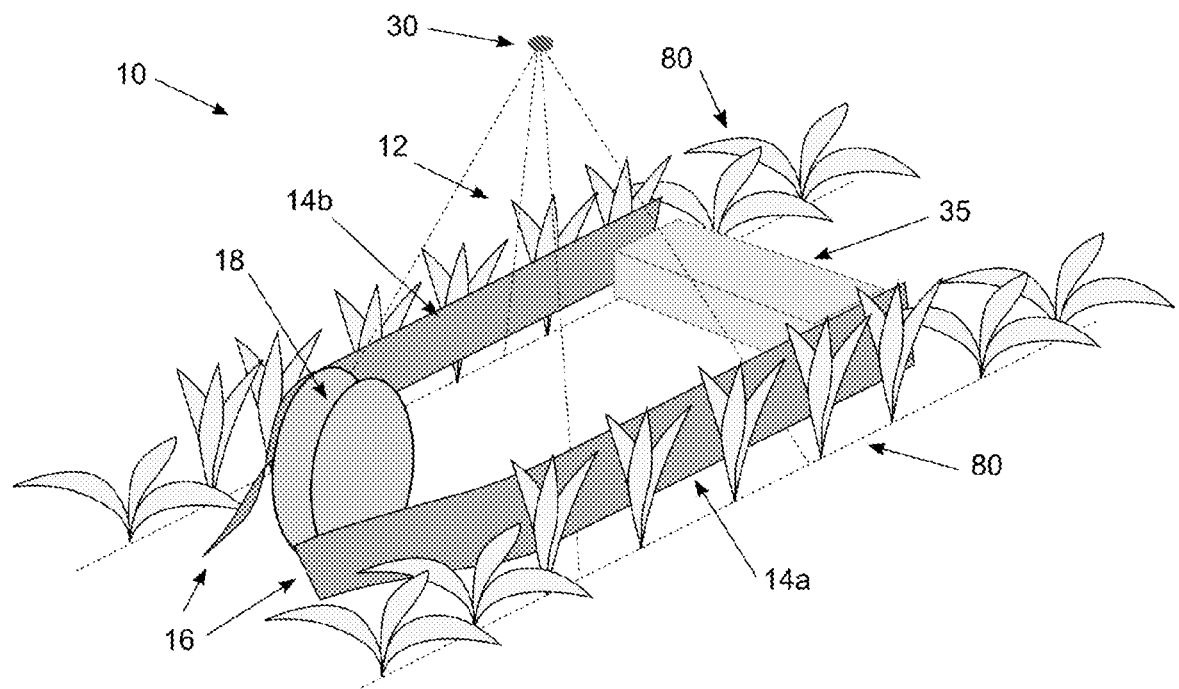
FIG. 1 shows a perspective schematic view of a robotic weed treatment processing equipment when operating according to an embodiment of the invention.
Figure 7A:
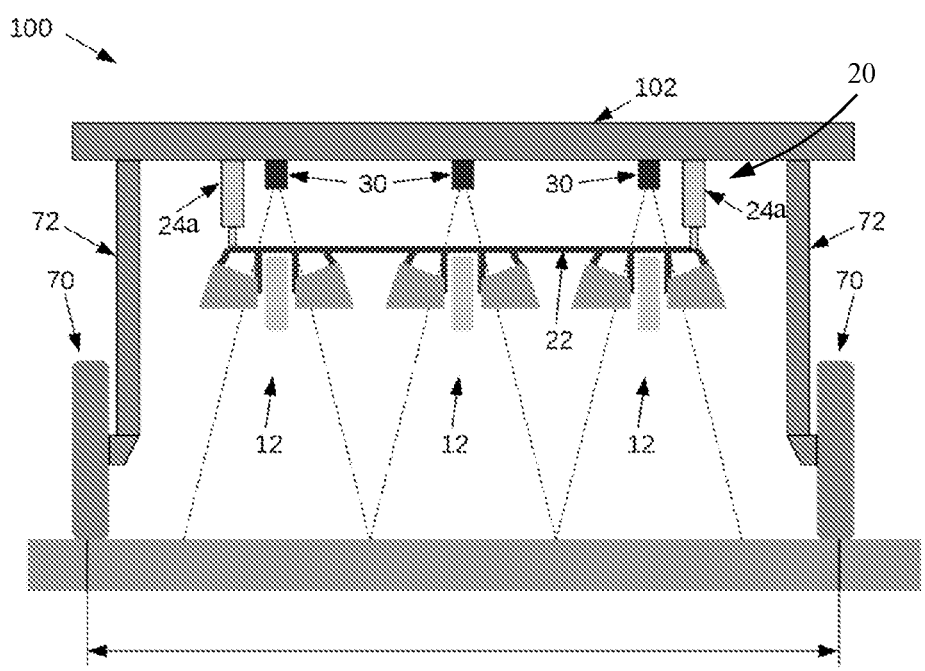
FIG. 7a shows a schematic partial front view of the agriculture robotic system of FIG. 3a when the wheels of said robotic system are oriented outwardly.
Figure 7B:
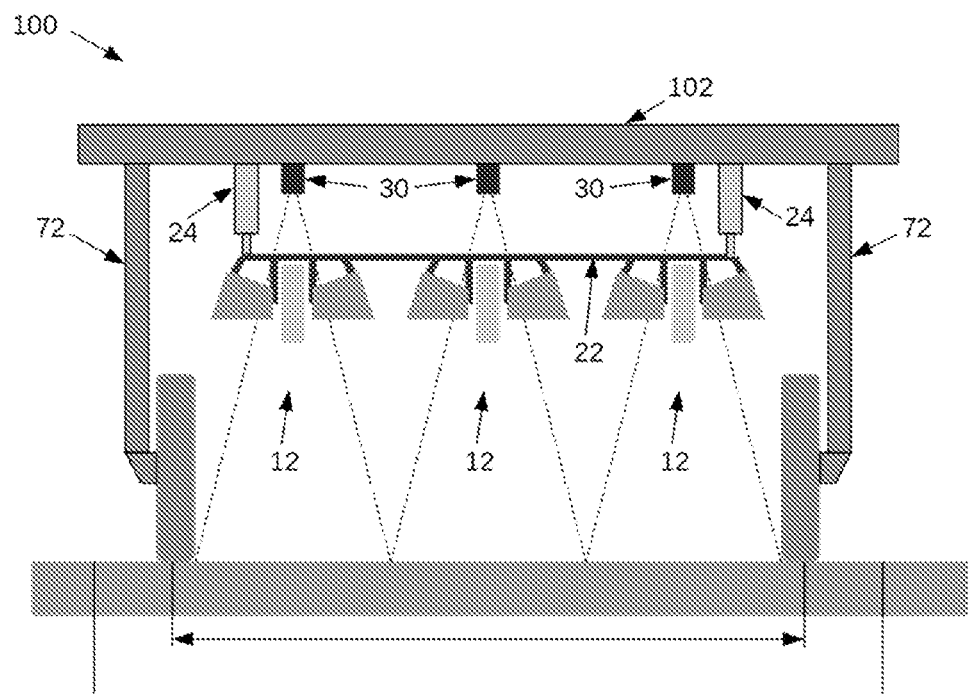
FIG. 7b shows a similar view of FIG. 7a when the wheels of said robotic system are oriented inwardly.

The agriculture robotic system 100 as shown for example in FIG. 7a may comprise for example three robotic weed treatment processing equipment 10 as illustrated in FIG. 1. Each robotic weed treatment processing equipment 10 is arranged next to each other along a direction perpendicular to the direction of the agriculture robotic system 100 when driving along alleys of a crop.

The agriculture robotic system 100 may however be adapted to comprise any number of robotic weed treatment processing equipment 10 according to the configuration of the crop to be treated and to the desired working width. The agriculture robotic system 100 may for example comprise two or three weed treatment processing equipment 10 for small to medium-sized robotic systems 100 or, four, five, six or even more weed treatment processing equipment 10 for large-sized robotic systems 100.

As shown in FIGS. 1 and 7a, each robotic weed treatment processing equipment 10 comprises a plant squeezer 12, a plant squeezer actuator 20 (FIGS. 3c and 4c), an image recognition device 30 and a weed processing equipment 35. The plant squeezer 12 may for example comprise a frame structure and a front wheel 18. The frame structure comprises a narrowing end portion 16 and two parallel longitudinal sides 14a, 14b extending backwards from the narrowing end portion 18 when the robotic weed treatment processing equipment 10 is mounted on the agriculture robotic system 100.

Figure 4A:
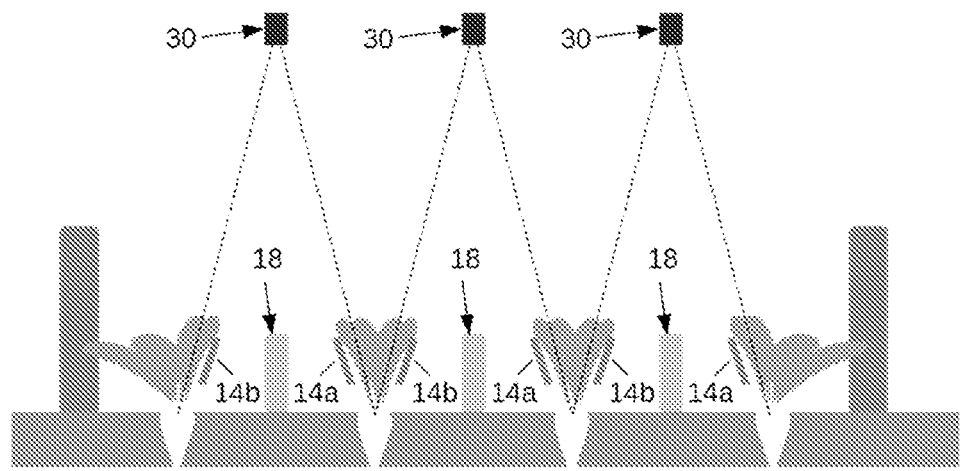
FIG. 4a shows a schematic partial cross-section view of an agriculture robotic system comprising three robotic weed treatment processing equipment of FIG. 1 when the plant squeezers are in an operating configuration.
Figure 4B:
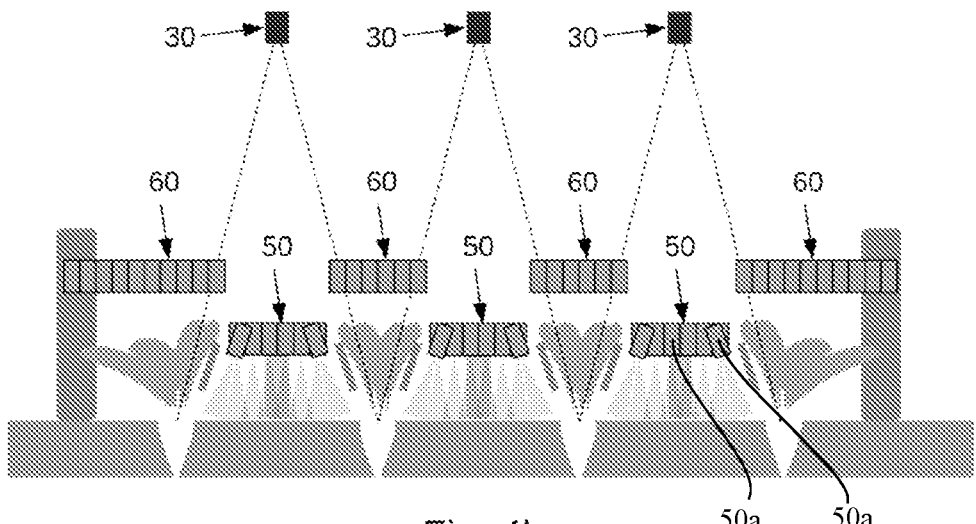
FIG. 4b shows another schematic partial cross-section view of the agriculture robotic system of FIG. 4a when only the weed spraying device of each robotic weed treatment processing equipment is operating according to an embodiment.
Figure 4C:
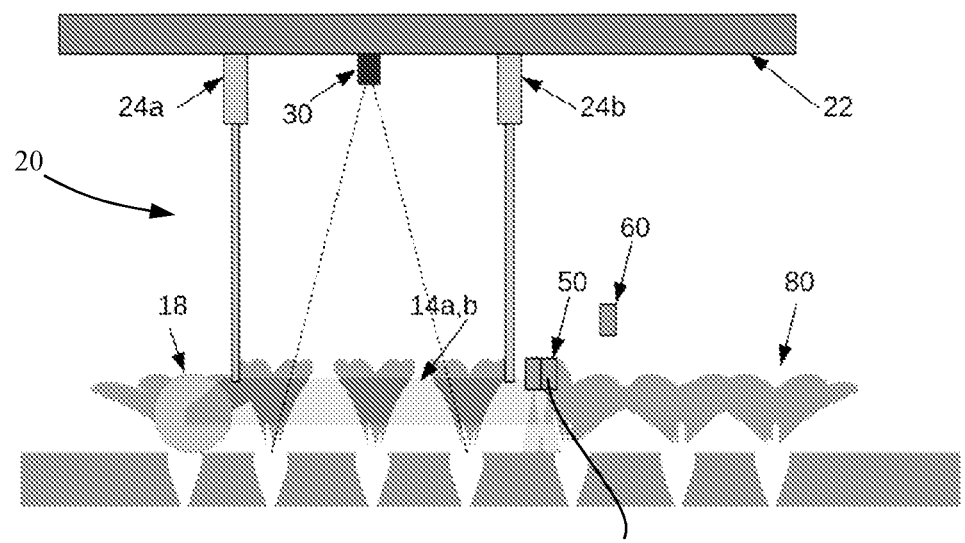
FIG. 4c shows a schematic partial side view of the agriculture robotic system of FIG. 4b.
Figure 5:
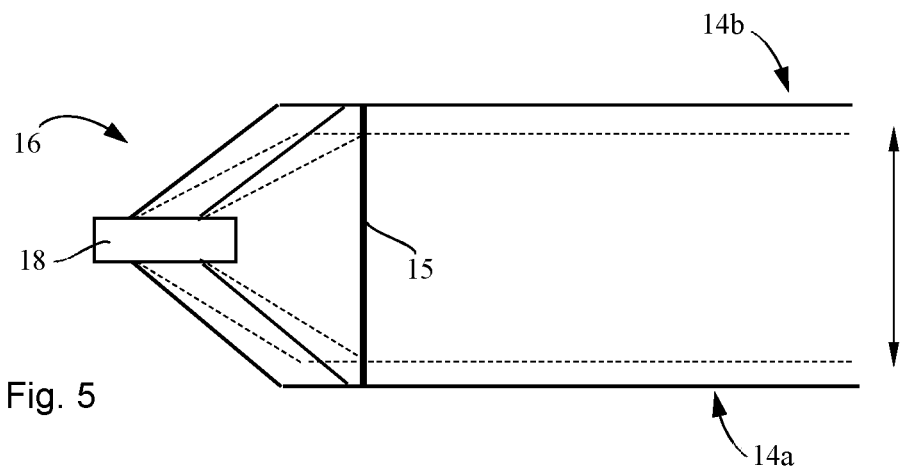
FIG. 5 shows a schematic top view of the plant squeezer according to an embodiment of the invention.

As shown for example in FIGS. 4c and 5, the front wheel 18 is connected to the narrowing end portion 16 of the plant squeezer 12 in order to allow a passive fine height adjustment of the plant squeezer according to the profile of the ground surface along which the wheel 18 rolls when the agriculture robotic system is operating.

As shown in FIG. 5, the plant squeezer 12 may further comprise a linear actuator 15 operatively connected to the two longitudinal sides 14a, 14b and extending therebetween to move the two longitudinal sides 14a, 14b away from each other or closer to each other in order to vary the distance between said two longitudinal sides to adapt the configuration of the plant squeezer 12 according to the distance between two parallel rows of cultivated plants. In this respect, the narrowing end portion 16 of the plant squeezer 12 comprises on both sides of the front wheel 18 an articulated parallelogram structure pivotally connected to respective longitudinal sides 14a, 14b. In variant, an actuator (not shown) may be arranged to cooperate with both articulated parallelogram structures of the plant squeezer.

Figure 6:
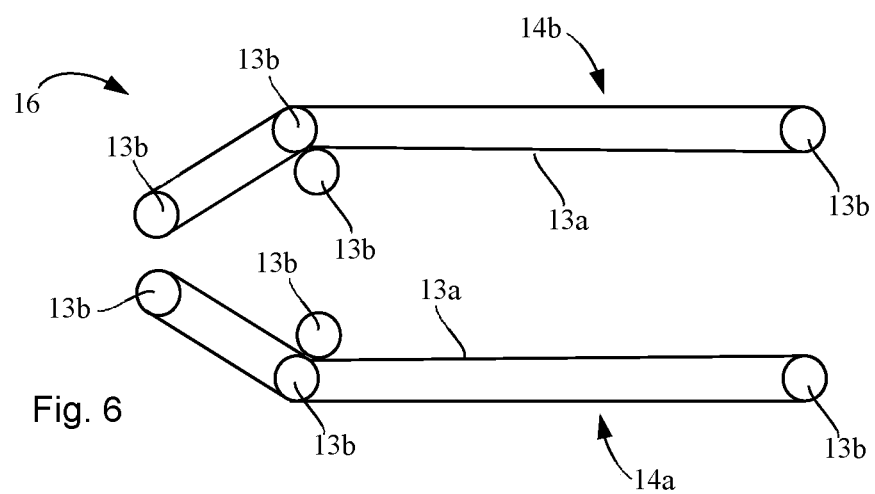
FIG. 6 shows a schematic top view of the plant squeezer according to another embodiment of the invention.

In another embodiment, as shown in FIG. 6, each of the two longitudinal sides 14a, 14b of the plant squeezer 12 comprises a rotatable belt 13a and pulleys 13b to drive the rotatable belt 13a. Each rotatable belt 13a is configured to become in contact against the corresponding row of two parallel rows of cultivated plants. The pulleys 13b may advantageously be driven at a speed dependent of the speed of the agriculture robotic system 100 to ensure no relative movement between the cultivated plants 80 and the belts when the agriculture robotic system is operating to avoid possible damage to the plants.

Figure 3A:
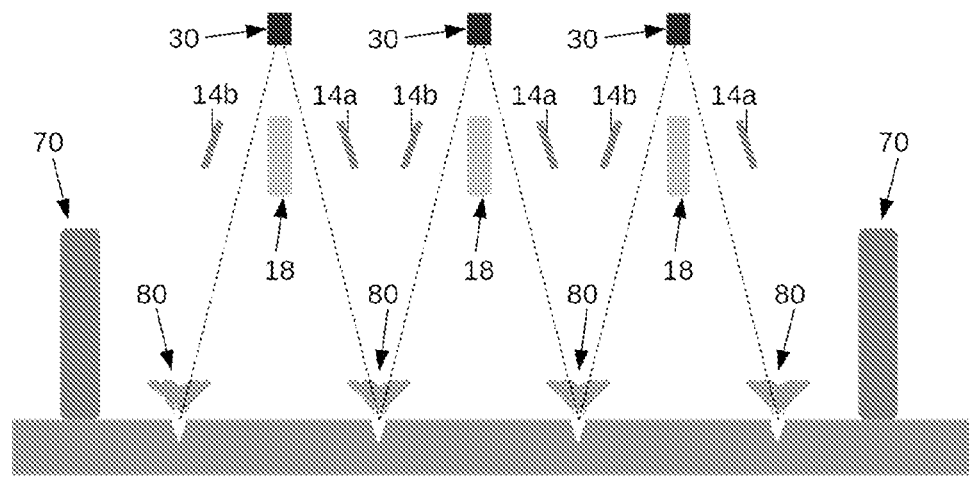
FIG. 3a shows a schematic partial cross-section view of an agriculture robotic system comprising three robotic weed treatment processing equipment of FIG. 1 when the plant squeezers are in a non-operating configuration.
Figure 3B:
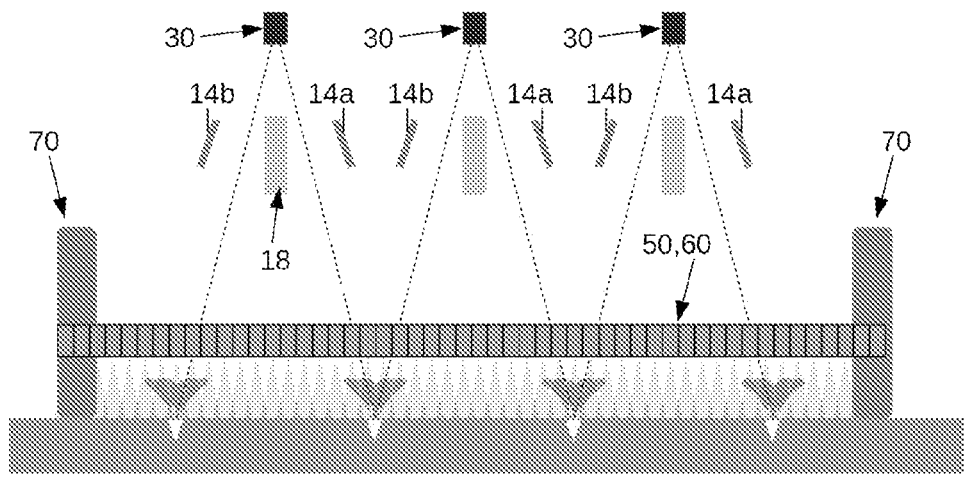
FIG. 3b shows another schematic partial cross-section view of the agriculture robotic system of FIG. 3a when both the weed and cultivated plant spraying devices are operating according to an embodiment.
Figure 3C:
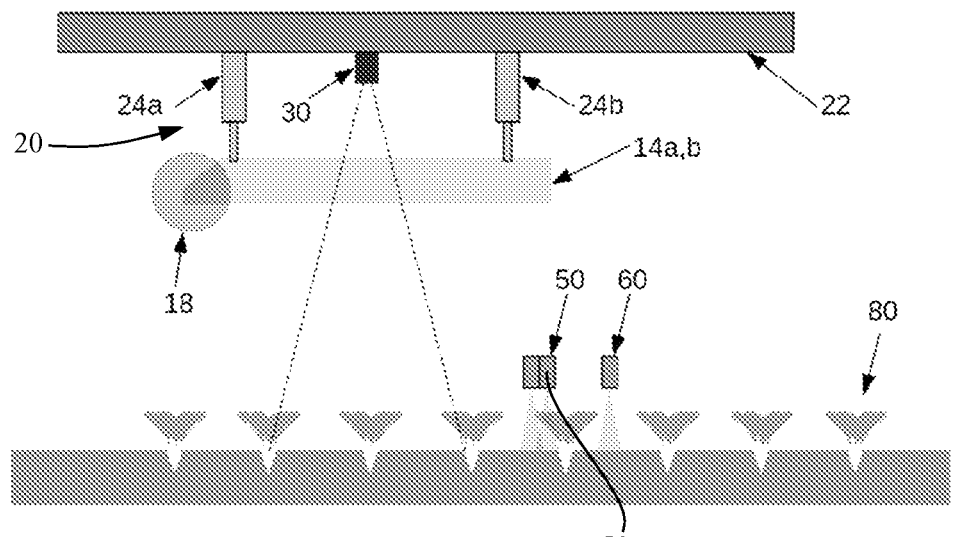

With reference to FIGS. 3c and 7a, the plant squeezer actuator 20 comprises a supporting structure 22 and several linear actuators 24a, 24b connected to a platform 102 of the robotic agriculture system 100 and to the supporting structure 22 in order to adapt the robotic agriculture system 100 either for the treatment of crops of young shoots or for the treatment of crops of plants which have grown to a certain size. These linear actuators may be for example hydraulic actuators, pneumatic actuators or electric actuators.

For the treatment of crops of plants which have grown to a size, whereby the base of the plants is hidden by their leaves, the linear actuators 24a, 24b move the supporting structure 22 downwards in order to bring the plant squeezers 12 in an operating configuration, whereby their respective front wheel 18 are in contact with the ground (cf. FIGS. 4a and 4c).

For the treatment of crops of young shoots, the linear actuators 24a, 24b move the supporting structure 22 upwards to lift the plant squeezers 12 from an operating configuration to a non-operating configuration (cf. FIGS. 3a, 3b and 3c).

Figure 2:
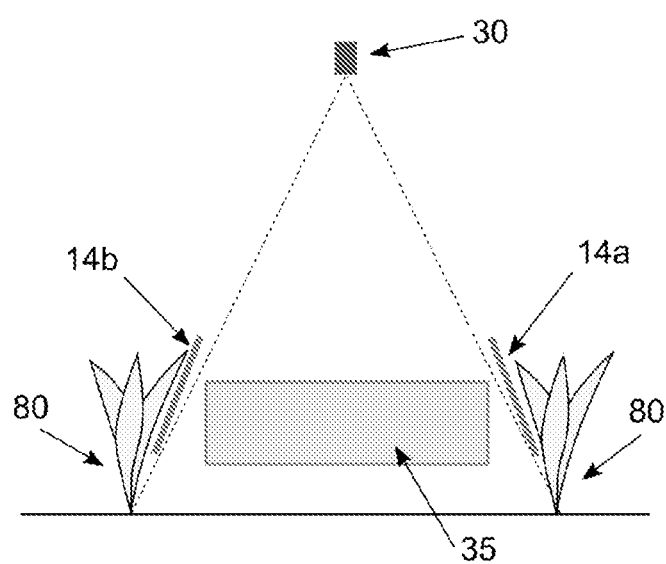
FIG. 2 shows a rear view of FIG. 1

With reference to FIG. 7a, the image recognition device 30 of each weed treatment processing equipment 10 are mounted on the lower side of the platform 102 of the robotic agriculture system 100 such that their respective visual angle covers at least the distance between the base of a first and a second cultivated plant which are part respectively of a first and a second row of cultivated plants 80 which are parallel as shown in particular in FIG. 2.

The robotic agriculture system 100 therefore comprises one image recognition device 30 per robotic weed treatment processing equipment 10. Three image recognition devices 30 may for example be used together to cover three parallel alleys of a crop, wherein each alley comprises two rows of cultivated plants 80 bordering each side of the corresponding alley as shown for example in FIGS. 3a and 3b.

Each image recognition device 30 may comprise an image capturing device 32 such as a monocular camera, a stereo camera, a 3D camera, a 3D scanning device or any device able to produce 2D or 3D images of a scene in any spectral band covering the ultra-violet, visible and infra-red spectrum. The image recognition device may also include a lighting equipment (not shown) which is configured to illuminate the area covered by the image capturing device 32.

Each image recognition device 30 further comprise a processing unit configured to run an image recognition software so as to identify weeds within an area extending across an alley up to the base of the cultivated plants located on each side of the alley for selective weeding or weed treatment.

As shown in FIG. 1, the plant squeezer 12 is configured to lift the leaves of cultivated plants 80 disposed along two parallel rows in order to increase the surface for weed treatment up to the base of each cultivated plant such that said increased surface matches the visual angle of the image recognition device 30.

Accordingly, the image recognition device 30 is capable of identifying weeds which may be located near the base of each rows of cultivated plants since their leaves are moved away from the field of vision of the image recognition device 30 by respective longitudinal sides 14a, 14, of the plant squeezer 12 and weed treatment may be selected to eradicate these weeds.

In the context of the present invention, weed treatment must be understood as comprising weeding as well as using chemical treatment such as herbicide to eradicate weeds. The agriculture robotic system therefore comprises for each robotic weed treatment processing equipment 10 a weed processing device 35 comprising a weed non-spraying device (not shown) and/or a weed spraying device 50.

The weed non-spaying device may comprise one or more mechanical tools selecting among the group comprising fixed or rotating blades, rotating lashes, thermal tools such as heating tools or firing nozzles, radiation emitting devices, laser emitting devices, electromagnetic waves emitting devices or electrical tools such as electrodes.

The weed spraying device 50 preferably comprises an herbicide reservoir and sprayers in fluid communication with the reservoir and configured to dispense herbicide on weeds which have been identified by the image recognition device 30. Use of selective herbicide is preferable in order to eradicate weeds without significant damage to nearby cultivated plants 80.

As particularly shown in FIG. 4b, the weed spraying device 50 may comprise a plurality of herbicide sprayers. Each or some of the herbicide sprayers may be mounted on a sprayer holder (not shown) connected to a linear actuator for selective vertical positioning of each sprayer or some sprayers. Particular sprayers may be pivotally actuable in order to dispense herbicide near the base of the cultivated plants 80.

The herbicide sprayers may be grouped into two or more spraying circuits in fluid communication with a reservoir. Each spraying circuit comprises an herbicide distribution circuit that may be individually controlled. This allows each group of sprayers to dispense different herbicide mixture contained in the reservoirs of the spraying circuits. Each spraying nozzles of each group may be positioned differently so as to allow for instance a first group of spraying nozzles to spray a first herbicide mixture only on the top of the cultivated plant, and a second group of spraying nozzles to spray a second herbicide mixture only on the base of the cultivated plants, or only on the ground surface extending between two parallel rows of cultivated plants.

With reference to FIGS. 3b-3c and 4b-4c, the agriculture robotic system 100 comprises a cultivated plant spraying device 60 comprising plant spraying tools configured to dispense herbicide, insecticide and/or fungicides. Each or some of the spraying tools may be mounted on a tool holder (not shown) connected to a linear actuator for selective vertical positioning of each plant spraying tool or some plant spraying tools. The weed processing equipment 35 may be arranged just ahead of the cultivated plant spraying device 60 to ensure that the cultivated plants of two parallel rows which are facing each other are treated quasi-simultaneously with the weeds.

Figure 8A:
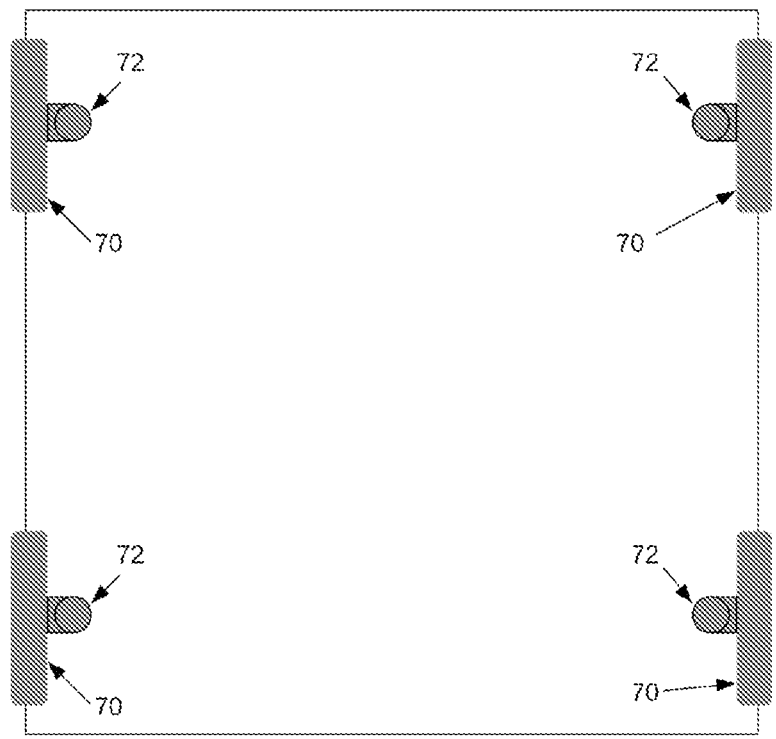
FIG. 8a shows a schematic bottom view of FIG. 7a without the robotic weed treatment processing equipment.
Figure 8B:
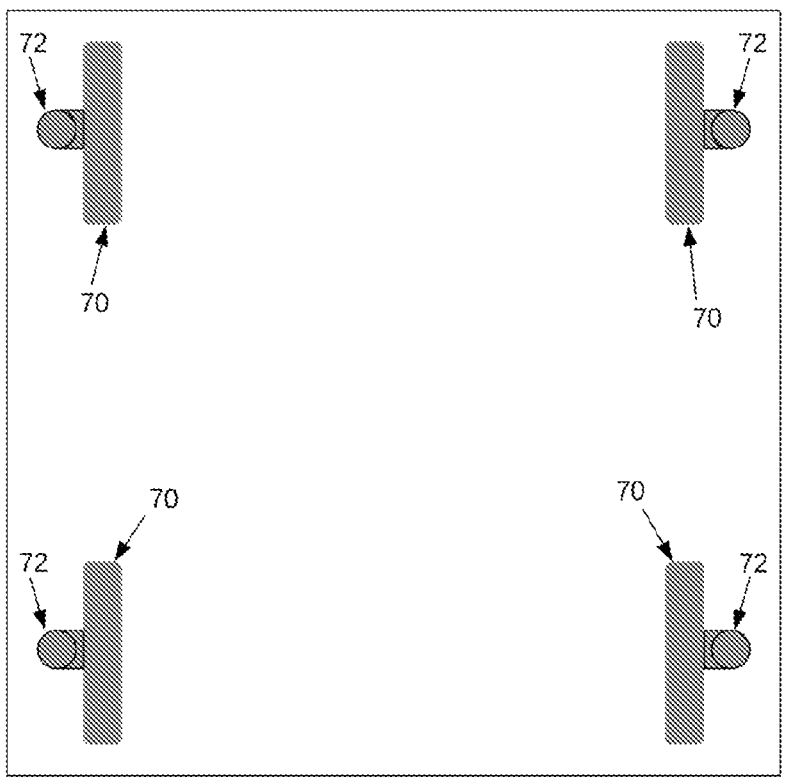
FIG. 8b shows a schematic bottom view of FIG. 7b without the robotic weed treatment processing equipment.

As shown in FIGS. 8a and 8b, the agriculture robotic system 100 comprises a first and a second set of wheels 70 located on respective lateral side of the agriculture robotic system 100. Each wheel 70 of the robotic system 100 is mounted on an axially vertical rotatable shaft 72. The agriculture robotic system comprises actuating means configured to move each wheel 70a, 70b from an outward position to an inward position through a rotation of 180 degrees of each rotatable shaft 72 in order to adapt the distance between the two paths followed by respective first and second set of wheels of the robotic system when operating. The distance between the lateral wheels of the agriculture robotic system 100 may therefore be adapted according to the configuration of the alleys of the crop to be treated.

In operation, the agriculture robotic system 100 travels along alleys of an agriculture crop comprising several parallel rows of cultivated plants. The plant squeezer 12 of each weed treatment processing equipment 10 are positioned near the platform 102 of the robotic system 100 in an non-operating configuration, as shown in FIGS. 3a to 3c and FIGS. 7a and 7b when the cultivated plants 80 to be treated are small enough so that their respective base can be seen by the image recognition devices for potential identification of weeds to be treated.

For treatment of crops of plants which have grown to a size, whereby the base of the plants is hidden by their leaves, the wheel 18 of the plant squeezer 12 of each robotic weed treatment processing equipment 10 is brought into contact to the ground before the agriculture robotic system 100 engages several alleys of the crop to be treated. The narrowing-end portion 16 of each plant squeezer 12 ensures smooth spreading of the leaves of the cultivated plants 80 when the agriculture robotic system 100 engages several alleys of the crop.

REFERENCE LIST

Robotic weed treatment processing equipment 10
Plant squeezer 12
  Frame structure
    Rotatable belts 13a (one embodiment)
    Pulleys 13b
  Longitudinal sides 14a, 14b
    Parallel flanks
      Inclined flanks
    Linear actuator 15
  Narrowing end portion 16
  Front wheel 18
Plant squeezer actuator 20
  Supporting structure 22
    Linear actuators 24a, 24b
      Hydraulic actuator
      Pneumatic actuator
      Electric actuator
Image recognition device 30
  Image capturing device
    Camera
  Lighting equipment
  Processing unit
Weed treatment processing device 35
  Weed non-spraying device
    Three-dimensional positional actuators
    Weeding elements
      Mechanical tools
        Fixed or rotating blades
        Rotating lashes
      Thermal tools
        Heating tools
        Firing nozzles Radiation emitting devices
Laser emitting devices
Electromagnetic waves emitting devices
Electrical tools
Electrodes
Weed spraying device 50
Herbicide sprayers
Selective linear actuators for vertical positioning
Supporting structure
Agriculture robotic system 100
Platform 102
Robotic weed treatment processing equipment
three robotic weed treatment processing equipment (one embodiment)
Cultivated plant spraying device 60
Plant spraying tools (fungicide/insecticide sprayer)
(linear tool holders
Selective linear actuators for vertical positioning
Wheels 70a, 70b
Vertical support 72
Axially rotatable shaft
Cultivated plants 80

The invention claimed is:

1. A Robotic weed treatment processing equipment for an agriculture robotic system, comprising:
a plant squeezer for squeezing cultivated plants, comprising a narrowing end portion and two longitudinal sides, said two longitudinal sides extending backwards from the narrowing end portion when the robotic weed treatment processing equipment is mounted on the agriculture robotic system;
a plant squeezer actuator operably connected to the plant squeezer for vertical displacement of the plant squeezer when the robotic weed treatment processing equipment is mounted on the agriculture robotic system;
an image recognition device for identification of weeds, and
a weed treatment processing device,
wherein the plant squeezer is configured to squeeze two parallel rows of cultivated plants to increase the weed treatment surface between said two parallel rows of cultivated plants.

2. The robotic weed treatment processing equipment according to claim 1, wherein the weed treatment processing equipment comprises a weed non-spraying device, a weed spraying device or both of said weed non-spraying and weed spraying devices.

3. The robotic weed treatment processing equipment according to claim 2,
wherein the weed spraying device comprises a plurality of group of sprayers and a corresponding plurality of distribution circuits comprising each an herbicide reservoir in fluid communication with a group of sprayers, wherein each of said plurality distribution circuits is configured to be individually controlled such that each said group of sprayers may dispense a different class of herbicide.

4. The robotic weed treatment processing equipment according to claim 3,
wherein each sprayer is connected to a linear actuator for selective vertical displacement of each said sprayer when the robotic weed treatment processing equipment is mounted on the agriculture robotic system.

5. The robotic weed treatment processing equipment according to claim 2,
wherein the weed non-spraying device comprises weeding elements, each weeding element being connected to a three-dimensional (3D) positioning actuator for selective 3D positioning of the weeding elements when the robotic weed treatment processing equipment is mounted on the agriculture robotic system.

6. The robotic weed treatment processing equipment according to claim 5,
wherein each of said weeding elements is selected from a group comprising a mechanical tool, a thermal tool, an electrical tool, a laser emitting device, a radiation emitting device and an electromagnetic wave emitting device.

7. The robotic weed treatment processing equipment according to claim 5,
wherein the weeding elements of said weed non-spraying device are arranged next to each other along a direction perpendicular to a direction of the agriculture robotic system when the robotic weed treatment processing equipment is mounted on the agriculture robotic system and said agriculture robotic system is operating.

8. The robotic weed treatment processing equipment according to claim 5,
wherein the weeding elements are configured to be selectively actuated for said 3D positioning depending on a specific location of action detected by the image recognition device.

9. The robotic weed treatment processing equipment according to claim 1,
wherein the plant squeezer comprises a front wheel mounted on the narrowing end portion of the plant squeezer in order to maintain said plant squeezer at a constant distance from the ground.

10. The robotic weed treatment processing equipment according to claim 1,
wherein the plant squeezer comprises a linear actuator configured to move the two longitudinal sides of the plant squeezer opposite from each other or toward each other in order to vary a distance between said two longitudinal sides to adapt the configuration of the plant squeezer according to a set distance between two parallel rows of cultivated plants.

11. The robotic weed treatment processing equipment according to claim 1,
wherein said two longitudinal sides of the plant squeezer are in an inclination, the inclination varying progressively outwardly along a longitudinal direction of the plant squeezer and away from said narrowing end portion.

12. The robotic weed treatment processing equipment according to claim 1, wherein the image recognition device for identification of weeds is mounted above the plant squeezer.

13. The robotic weed treatment processing equipment according to claim 1,
wherein each of the two longitudinal sides of the plant squeezer comprises a rotatable belt and pulleys to drive the rotatable belt,
each said rotatable belt being configured to become in contact against a corresponding row of the cultivated plants, and wherein the pulleys are configured to be driven at a speed dependent to a speed of the agriculture robotic system to ensure no relative movement between the cultivated plants and the rotatable belts when the agriculture robotic system is operating.

14. An agriculture robotic system comprising at least one robotic weed treatment processing equipment comprising:
a plant squeezer for squeezing cultivated plants, comprising a narrowing end portion and two longitudinal sides, said two longitudinal sides extending backwards from the narrowing end portion when the robotic weed treatment processing equipment is mounted on the agriculture robotic system;

a plant squeezer actuator operably connected to the plant squeezer for vertical displacement of the plant squeezer when the robotic weed treatment processing equipment is mounted on the agriculture robotic system;

an image recognition device for identification of weeds, and a weed treatment processing device, wherein the plant squeezer is configured to squeeze two parallel rows of cultivated plants to increase the weed treatment surface between said two parallel rows of cultivated plants.

15. The agriculture robotic system according to claim 14, comprising three robotic weed treatment processing equipment, wherein said three robotic weed processing equipment are arranged next to each other along a direction perpendicular to a direction of the agriculture robotic system when operating.

16. The agriculture robotic system according to claim 14, wherein the at least one robotic weed treatment processing equipment or each of the three robotic weed treatment processing equipment is positioned for treating a surface extending perpendicular to two parallel rows of cultivated plants up to or within a distance to a base of said cultivated plants.

17. The agriculture robotic system according to claim 14, further comprising a cultivated plant spraying device comprising plant spraying tools, each or a least one of the plant spraying tools being connected to a linear actuator for selective vertical displacement of said each or at least one spraying tools.

18. The agriculture robotic system according to claim 17, wherein the cultivated plant spraying device is arranged rearward the weed treatment processing equipment relative to a driving direction of said agriculture robotic system when operating.

19. The agriculture robotic system according to claim 14, comprising a first and a second set of wheels located on a respective lateral side of the agriculture robotic system, each wheel of said agriculture robotic system is mounted on an axially vertical rotatable shaft to move each said wheel from an outward position to an inward position through a rotation of 180 degrees of each rotatable shaft in order to adapt a distance between two paths followed by respective first and second set of wheels of said robotic system when operating.

* * * * *